July 7, 1964 K. PFLÜCKE ETAL 3,139,719
MOWING ATTACHMENT FOR AGRICULTURAL MACHINES
Filed Nov. 8, 1961 2 Sheets-Sheet 1
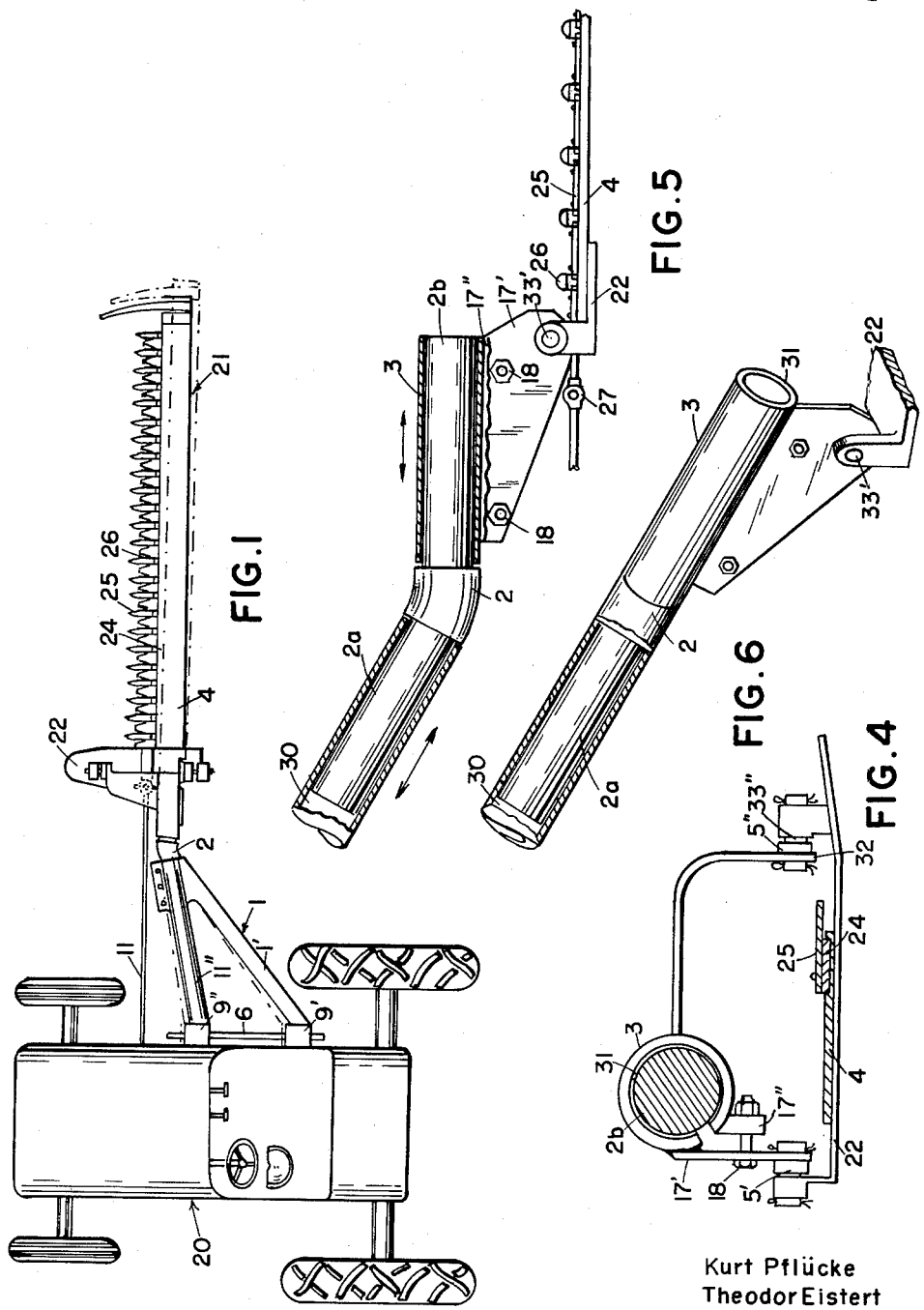
Kurt Pflücke
Theodor Eistert
INVENTORS.
BY Karl F. Ross
AGENT.

July 7, 1964  K. PFLÜCKE ETAL  3,139,719
MOWING ATTACHMENT FOR AGRICULTURAL MACHINES
Filed Nov. 8, 1961  2 Sheets-Sheet 2
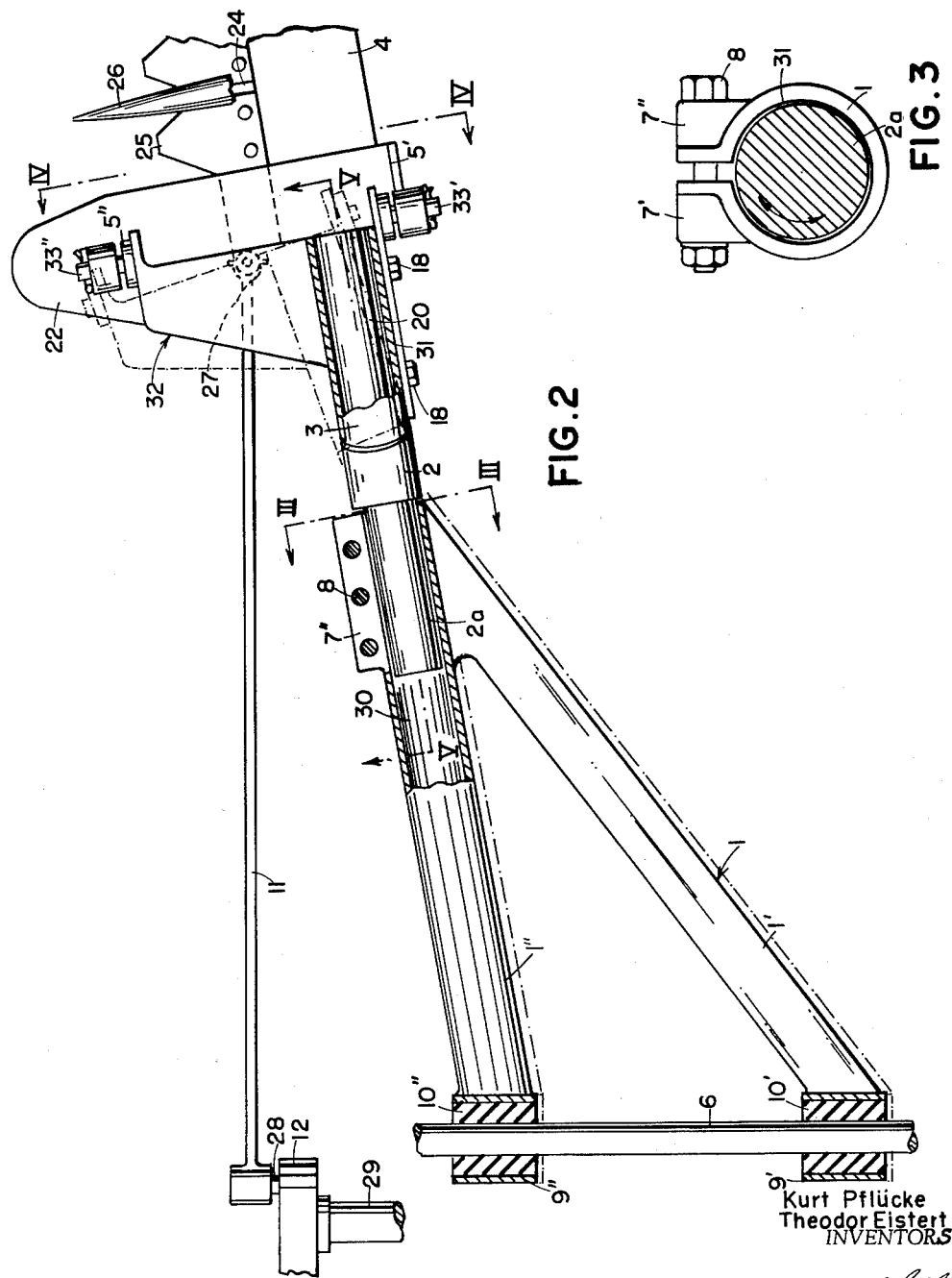
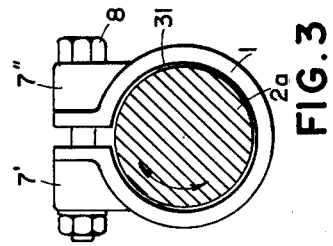
Kurt Pflücke
Theodor Eistert
INVENTORS.
BY  Karl F. Ross.
AGENT.

United States Patent Office 3,139,719
Patented July 7, 1964

3,139,719
MOWING ATTACHMENT FOR AGRICULTURAL MACHINES
Kurt Pflücke, Berthensdorf, and Theodor Eistert, Neustadt, Saxony, Germany, assignors to VEB Fortschritt, Erntebergungsmaschinen, Neustadt, Saxony, Germany, a corporation of Germany
Filed Nov. 8, 1961, Ser. No. 150,964
5 Claims. (Cl. 56—288)

Our present invention relates to an outrigger type mowing attachment adapted to be used either on a tractor or on a trailer towed by such tractor.

It is sometimes necessary to adjust the position of an implement of this type relative to the vehicle to which it is attached, either angularly for varying the swath or longitudinally (i.e. in the direction generally transverse to the path of the vehicle) in order to modify the bite of its cutter. Prior attempts at so mounting the attachment as to facilitate either type of adjustment have resulted in relatively complex linkages by which, moreover, angular and linear displacements could not be carried out independently of each other so that intricate compensating adjustments were necessary if only one type of adjustment, e.g. that of the swath, was desired.

It is, therefore, the general object of our invention to provide means for mounting such attachment on its supporting vehicle in a manner avoiding these drawbacks.

A more particular object of the invention is to provide adjustable mounting means for such attachment wherein the pivotal axis for a horizontal swinging of the cutter is located close to the inner shoe of the cutter support whereby any shifting of this support relative to the cutter drive on the vehicle, upon changes in angular position, is minimized.

Another object of this invention is to provide, as the aforementioned mounting means, a sturdy and rigid structure free from universal joints and similar fast-wearing parts.

The foregoing objects are realized, in accordance with our present invention, by the provision of a rigid link member between the vehicle and the attachment, this link member being swingable about and preferably slidable along a substantially horizontal axis while forming, at its end remote from that axis, a socket for one extremity of a bent arm whose other extremity is received in a similar socket of a hinge member to which the cutter-supporting beam is articulated for swinging movement about another substantially horizontal axis. The two sockets are provided with fastening means, such as clamps, for immobilizing the respective extremities of the bent arm in different rotary positions whereby the two horizontal axes can be deviated from mutual parallelism to a greater or less extent with corresponding deviation of the outrigger from its normal position transverse to the vehicle motion. Alternatively or concurrently, an axial shifting of either or both arm extremities in their respective sockets changes the relative position of the fixed rake teeth on the beam and the reciprocating cutting teeth on the movable blade which is linked with its vehicle-borne drive by an elongated element (e.g. a pitman) of constant length. The slidability of the link member on its pivotal axis enables the maintenance of proper alignment between the blade and its drive in all positions of angular adjustment.

The invention will be described in greater detail with reference to the accompanying drawing in which:

FIG. 1 is a top-plan view of a tractor with outrigger attachment according to the invention;

FIG. 2 is a fragmentary top-plan view of the attachment, drawn to a larger scale;

FIGS. 3 and 4 are cross-sectional views, drawn to an enlarged scale taken on the lines III—III and IV—IV, respectively of FIG. 2;

FIG. 5 is an enlarged fragmentary side-elevational view of the attachment of FIG. 2; and FIG. 6 is an enlarged fragmentary view similar to FIG. 5, showing the attachment in a different position.

In FIG. 1 we have shown a tractor 20 with an outrigger-type mowing attachment 21 fastened thereto. The conventional part of this attachmhent consists of a beam 4, resting on an inner shoe 22 and an outer shoe 23, whereon a cutter blade 24 with teeth 25 is slidable in longitudinal direction of the beam. Rake teeth 26 are rigid with beam 4 and form gaps between which the teeth 25 are exposed as they reciprocate under the control of a pitman 11, the latter being connected to blade 24 by a universal joint 27 and having its opposite extremity joined to a crank 28 on a driven disk 12. The bite of the cutter, i.e. the extent to which the teeth 25 are offset from the teeth 26 in the extreme positions of the reciprocating motion, can be varied by an inward or outward displacement of beam 4 relative to the shaft 29 of disk 12.

In accordance with our invention there is provided on the vehicle 20 a fixed rod 6, extending horizontally in the direction of travel, on which a link 1 is pivoted. This link is bifurcated and consist of two legs 1', 1" which are joined together at their extremities remote from rod 6, their other extremities forming bearings 9', 9" which are lined with rubber bushings 10', 10" and receive the rod 6 for swinging and sliding displacement thereon. Thus, the member 1 can swing bodily about the axis of rod 6 or shift along this rod relatively to pitman 11.

The leg 1" is tubular and, at its junction with leg 1', forms a socket 30 for an extremity 2a of a bent arm 2 whose other extremity 2b is similarly received in a socket 31 formed by a tubular extension 3 of a hinge member 32. This member forms bearings 5', 5" for pins 33', 33" by which the inner shoe 22 of the attachment 21, rigid with beam 4, is swingably secured to it for rotation about a horizontal axis. Sockets 30 and 31 are split longitudinally and provided with outwardly projecting flanges 7', 7" and 17', 17" which can be drawn together by bolts 8 and 18, respectively, to clamp the respective extremities 2a, 2b firmly in place.

It will thus be apparent that, upon a loosening of clamping bolts 8 and 18, the bent arm 2 may be turned in its socket so that the beam 4 of the attachment will be swung from its normal transverse position into alternate positions such as those shown in dot-dash lines in FIGS. 1 and 2. At the same time the angle of elevation of link 1 will be changed as illustrated in FIGS. 5 and 6. Proper alignment between crank 28 and joint 27 can be maintained by a shifting of link 1 along its supporting rod 6. The bite of the cutter can be changed independently of its angular position, and with at most a slight forward or rearward displacement of shoe 22, by an axial adjustment of extremity 2b in socket 31 or, in certain positions, of extremity 2a in socket 30.

It will be apparent that other ways of coupling the extremities of bent arm 2 to link 1 and hinge member 32 with freedom of axial and angular adjustment may be used and that the invention is not limited to the specific embodiment described and illustrated except as specified in the appended claims.

We claim:
1. An outrigger attachment for an agricultural vehicle, comprising an elongated support, a blade longitudinally movable on said support and provided with cutting teeth, a set of fixed rake teeth on said support adjacent said cutting teeth, a link member articulated to said vehicle for pivotal movement about a first substantially hori- zontal axis, and sliding displacement therealong, a hinge member articulated to said support for relative pivotal movement about a second substantially horizontal axis, a bent arm interconnecting said members, each of said members having fastening means for securing respective extremities of said arm in a plurality of different rotary positions relative thereto, at least one of said extremities being also axially adjustable relatively to the respective member, and an elongated element connecting said blade with a reciprocating drive on said vehicle, each of said members being provided with a socket receiving the respective extremity of said arm with freedom of rotary and axial adjustment.

2. An attachment according to claim 1 wherein each of said sockets is formed by a longitudinally slitted tube provided with clamping means for tightening it about said arm.

3. An attachment according to claim 1 wherein said link member comprises a pair of legs rigidly joined together at the socket thereof, said legs being provided with free ends remote from said socket forming bearings for a rod on said vehicle.

4. An attachment according to claim 3 wherein said bearings are provided with elastic linings.

5. An attachment according to claim 3 wherein one of said legs is tubular, said socket of said link member being formed by said tubular leg.

References Cited in the file of this patent

UNITED STATES PATENTS

| | | |
|---|---|---|
| 642,524 | Kane | Jan. 30, 1900 |
| 2,628,467 | Gillespie | Feb. 17, 1953 |
| 2,684,564 | Schroeppel | July 27, 1954 |